(12) United States Patent
Balasubramaniam (10) Patent No.: US 7,474,899 B1
(45) Date of Patent: Jan. 6, 2009

(54) METHOD AND APPARATUS FOR COMMUNICATING USING WIRELESS CONTROL CHANNELS

(75) Inventor: Saraswathi Balasubramaniam, Fremont, CA (US)

(73) Assignee: Aeris.Net, San Jose, CA (US)

( * ) Notice: Subject to any disclaimer, the term of this patent is extended or adjusted under 35 U.S.C. 154(b) by 306 days.

(21) Appl. No.: 10/172,476

(22) Filed: Jun. 14, 2002

Related U.S. Application Data (60) Provisional application No. 60/298,577, filed on Jun. 15, 2001.

(51) Int. Cl.
*H04Q 7/20* (2006.01)
(52) U.S. Cl. ............... 455/458; 455/404.1; 455/445; 455/417; 455/427; 455/430; 455/435.1
(58) Field of Classification Search ............ 455/404.1, 455/445, 417, 427, 430, 435.1, 456.1, 436, 455/450, 403, 67.1, 452, 424, 458
See application file for complete search history.

(56) References Cited

U.S. PATENT DOCUMENTS 5,873,043 A * 2/1999 Comer .................. 455/458
6,118,999 A * 9/2000 Moraes et al. ............ 455/430
6,167,248 A * 12/2000 Hamalainen et al. ...... 455/403
6,630,883 B1 * 10/2003 Amin et al. .............. 340/7.29
2002/0164977 A1 * 11/2002 Link, II et al. ............ 455/414
2004/0027244 A9 * 2/2004 Menard ................ 340/573.1

OTHER PUBLICATIONS

The American Heritage College Dictionary, Fourth Edition, p. 1263.*

* cited by examiner

*Primary Examiner*—Charles N Appiah
*Assistant Examiner*—Randy Peaches
(74) *Attorney, Agent, or Firm*—Blakely Sokoloff Taylor & Zafman (57) ABSTRACT

A method and apparatus for transmitting messages between a communicator and a central monitoring station using a wireless control channel, bypassing voice channels comprising, receiving a message at a communicator the message comprising application specific data, encoding the message along with a call origination trigger in a call origination control message to invoke forwarding of the encoded message and the encoded call origination trigger by a serving system upon detecting the call origination trigger. Transmitting the call origination control message to the serving system over the wireless control channel. The serving system detects the call origination trigger, and forwards the call origination trigger and the encoded message over a communications channel to a central monitoring station in response to detecting the call origination trigger. The central station decodes the encoded message to retrieve the application specific data.

27 Claims, 5 Drawing Sheets

FIG. 1A

OCTET STRING

| H | G | F | E | D | C | B | A | |
|---|---|---|---|---|---|---|---|---|
| RtC | Unvec | W2 | Int'l | OLATA | ILATA | lOCAL | ALL | 1 |
| RESERVED | | | PA | DP | Pound | DS | Star | 2 |
| 7 DIGITS | 6 DIGITS | 5 DIGITS | 4 DIGITS | 3 DIGITS | 2 DIGITS | 1 DIGIT | NO DIGITS | 3 |
| 15 DIGITS | 14 DIGITS | 13 DIGITS | 12 DIGITS | 11 DIGITS | 10 DIGITS | 9 DIGITS | 8 DIGITS | 4 |
| | | | | | | | | n |

METHOD AND APPARATUS FOR COMMUNICATING USING WIRELESS CONTROL CHANNELS

CROSS REFERENCE TO RELATED APPLICATION

This application claims the benefit of U.S. provisional patent application No. 60/298,577 entitled "Method and Apparatus for Communicating Using Wireless Control Channels" filed Jun. 15, 2001.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to the field of communications. In particular, the present invention is related to a method and apparatus for transmission of data messages using the control channels of existing wireless communication infrastructure.

2. Description of the Related Art

Transmission of application specific data using the Remote Feature Access control request documented in the Telecommunications Industry Association/Electronic Industry association (TIA/EIA)-41 specification, (IS-41 specification), is well known in the art. Aeris Communications, Inc., of San Jose, Calif., and the assignee of the present invention transmits application specific data in a Remote Feature Access control request. The application specific data is encoded in the Dialed Digits field of the Reverse Control Channel (RECC) packet as a Remote Feature Access Control request transmitted by a communicator or a mobile unit. This RECC transmission is termed a MicroBurst™ packet. The MicroBurst™ packet is handled by a serving system (SS) in the same way as any other control channel message originated by a mobile unit.

Using control channels for transmission of application specific data has significant advantages over using the voice channels for such transmissions. The control channels are robust enough to work where voice channels may be unusable. The control channels broadcast at the maximum allowed radio frequency power allowed for the cellular system. Moreover, each word in the transmission is repeated multiple times to ensure that the correct information is received at the cellular switch. Finally, the control channels are normally underutilized, and may be used for transmission of application specific data without significantly impacting the voice cellular system.

The MicroBurst™ packet that is transmitted by the communicator arrives at a central monitoring station via one or more SSs. When the MicroBurst™ packet arrives at a central monitoring station, the central monitoring station extracts the application specific data embedded in the Dialed Digits field. The application specific data is then acted upon in accordance with the application requirements. For example, the acquired application specific data may be transferred to a local computer system for further processing by the application, or the data may be sent to an Applications Service Provider for further processing.

Since there is no requirement for the SS and the central monitoring station to assign a reverse voice channel to the communicator on receipt of the application specific data packet by the central monitoring station, the central monitoring station requests the SS to terminate communications between the communicator and the SS without requiring voice channel access by the communicator. Since the required application specific data is transmitted within the initial control channel data packet, no further interaction between the central monitoring unit and the communicator is necessary.

However, encoding the application data in the Dialed Digits field of the RECC packet as a Remote Feature Access Control request implies that the data begin with a "Reach-Back" character, i.e., an "*". This limits manufacturers of communicators and mobile units who must ensure that the Reach-Back character is the first character that is transmitted in the dialed digits field of the RECC packet.

Each communicator is allocated at least one Mobile Identification Number (MIN), and in some situations, communicators may be allocated multiple MINs. For example, when data from multiple sensors of an alarm system are transmitted to a communicator, each sensor may be allocated a particular MIN, thereby utilizing multiple MINs for the multiple sensors. Assigning multiple MINs to each communicator utilizes cellular system resources because for a finite number of digits allowed in a MIN, a finite number of digits may be assigned. Also, the length of the Dialed Digits field transmitted by each communicator is limited to 32 digits. What is needed is a method and apparatus to encode application data in a more flexible way, wherein the first character of the Dialed Digits field is not limited to an "*", wherein multiple events are triggered without the use of multiple MINs, and the length of Dialed Digits field transmitted is not restricted to 32 digits.

BRIEF SUMMARY OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION OF THE INVENTION

Described is a method and apparatus for data transmission using wireless control channels, bypassing the voice channels. In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

The embodiment described herein provides a novel solution for implementing two way data short messaging communications utilizing cellular control channels and cellular switch origination request methods as detailed in interim standards, IS-553, IS-54B, IS-95, IS-661, IS-136, and IS-41. The embodiment described herein utilizes the SS7 signaling network. However, any inter-cellular serving area network channels may be utilized.

In one embodiment of the invention, a communicator transmits a call origination message to a serving system (SS). A SS as described herein, is a single entity that encompasses the Mobile Switching Center (MSC) and the Visitor Location Register (VLR) functional entities. One skilled in the art will appreciate that a MSC is a functional entity in the cellular network that provides the cellular radio-telephone switching function, and that a VLR is a local database that maintains temporary records associated with individual network subscribers. MSCs and the VLRs are often combined in the same physical equipment; however, this need not be the case. VLRs contain a communicator's location and service information. MSCs access VLRs to retrieve information for the handling of calls to and from communicators.

The call origination message transmitted by the communicator includes a call origination trigger comprising a particular sequence of binary bits, a mobile identification number for identifying the communicator, application specific data, and other preamble words known to one having ordinary skill in the art. One skilled in the art will also appreciate that a call origination message is a wireless control message. The SS on receiving the call origination message compares the received call origination trigger with call origination triggers stored in the VLR, and, on obtaining a match between the call origination triggers, transmits a call origination request Invoke (ORREQ) message to the communicator's central monitoring station. The ORREQ message that is transmitted to the central monitoring station includes the application specific data as well as the call origination trigger received from the communicator. The central monitoring station extracts the application specific data from the ORREQ message received and ends the communication with the SS without assigning a voice channel to the communicator. Thus, application specific data is transmitted to a communicator's central monitoring station using wireless control channels, bypassing the voice channels. This process will now be described in detail.

Figure 1A:
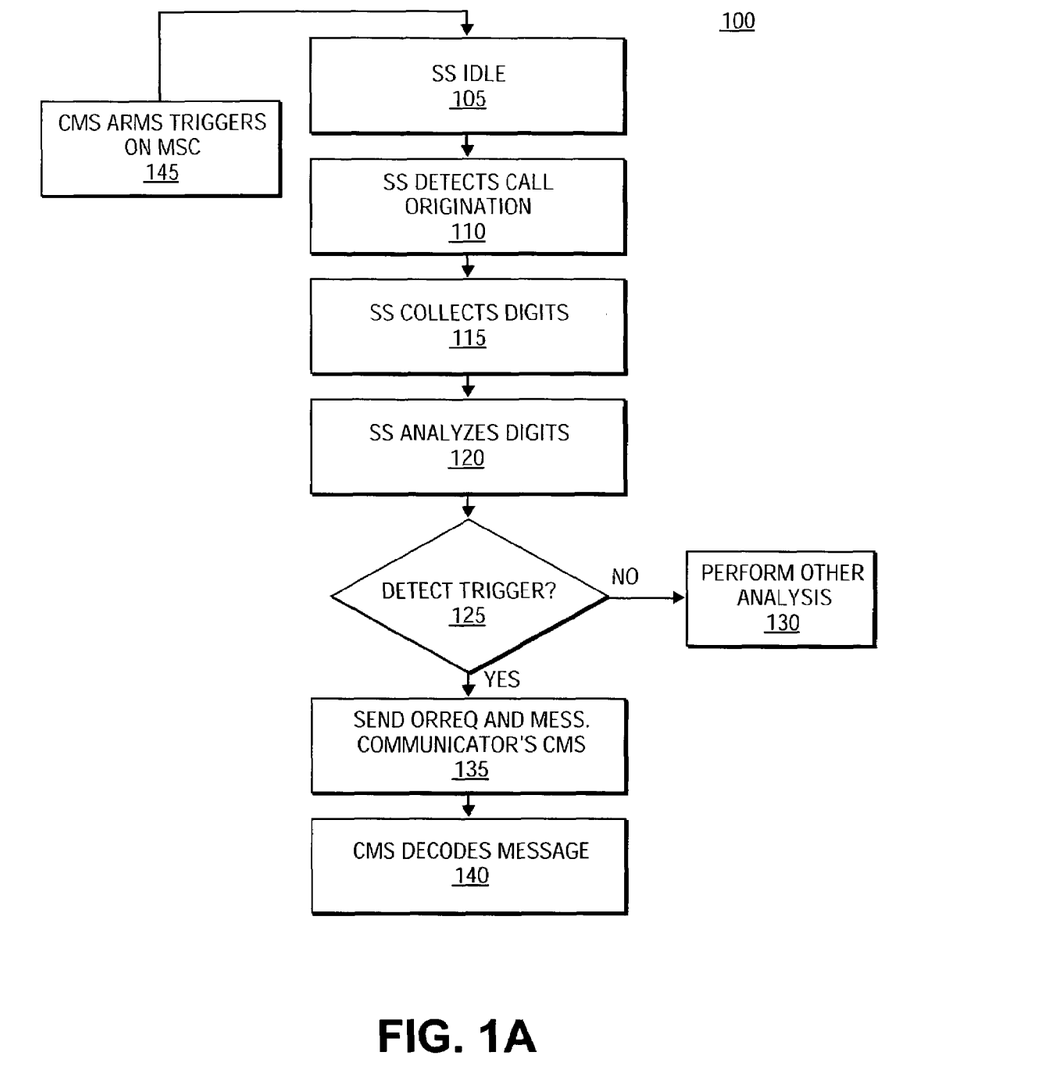
FIG. 1A illustrates an embodiment of the invention wherein a serving system (SS) monitors a communicator, and transmits received calls to a central monitoring station.

FIG. 1A illustrates a simplified call origination process wherein a SS receives a transmission from a communicator or mobile station comprising application specific data included in a wireless control message. Prior to the communicator transmitting the wireless control message along with the included application specific data to a SS, the SS is armed with call origination triggers. Arming the SS with call origination triggers comprises, the communicator's central monitoring station transmitting the call origination triggers to the communicator's SS, and the SS storing the received call origination triggers in the VLR.

Figure 1B:
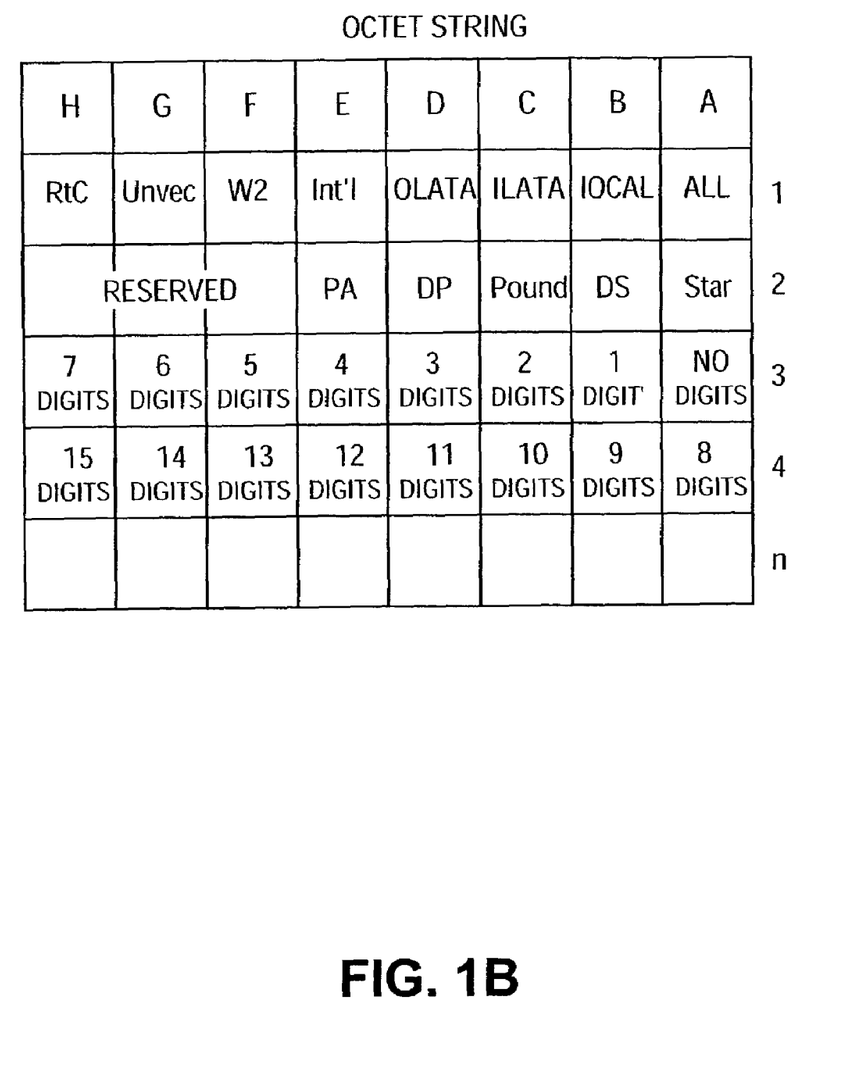
FIG. 1B illustrates a call origination trigger octet string utilized by an embodiment of the invention.

One skilled in the art will appreciate that call origination triggers comprise an octet string as shown in FIG. 1B. Placing a '0' in any octet bit indicates that a particular trigger is inactive. Placing a '1' in the octet bit activates a particular trigger. For example, in normal cellular communications, placing a '1' in octet bit A of the call origination trigger causes the SS to transmit an ORREQ message to the central monitoring station for any transmission received from a mobile station such as a cell phone. Placing a '1' in octet bit B of the call origination trigger causes the SS to transmit an ORREQ message to the cell phone's central monitoring station for any local call attempt. One skilled in the art will appreciate that numerous call origination triggers exist as is described in the IS-41 specification.

In one embodiment of the invention the call origination triggers described above are used by the communicator to transmit application specific data from the communicator to the communicator's central monitoring station. For example, by arming a call origination trigger of a SS with a '1' in octet one, bit A, any transmission, including the application specific data that is received from a communicator may be transmitted to the communicator's central monitoring station. As another example, by placing a '1' in octet one, bit B of a call origination trigger on the SS, and including the call origination trigger in a call origination message transmitted by the communicator, the application specific data that is encoded in the call origination message may be transmitted to the communicator's central monitoring station. Thus, by arming the SS with call origination triggers and including one of the call origination triggers in a call origination message that is transmitted by the communicator to the SS, the application specific data that is encoded in the call origination message may be transmitted from the communicator to the communicator's central monitoring station.

Figure 3:
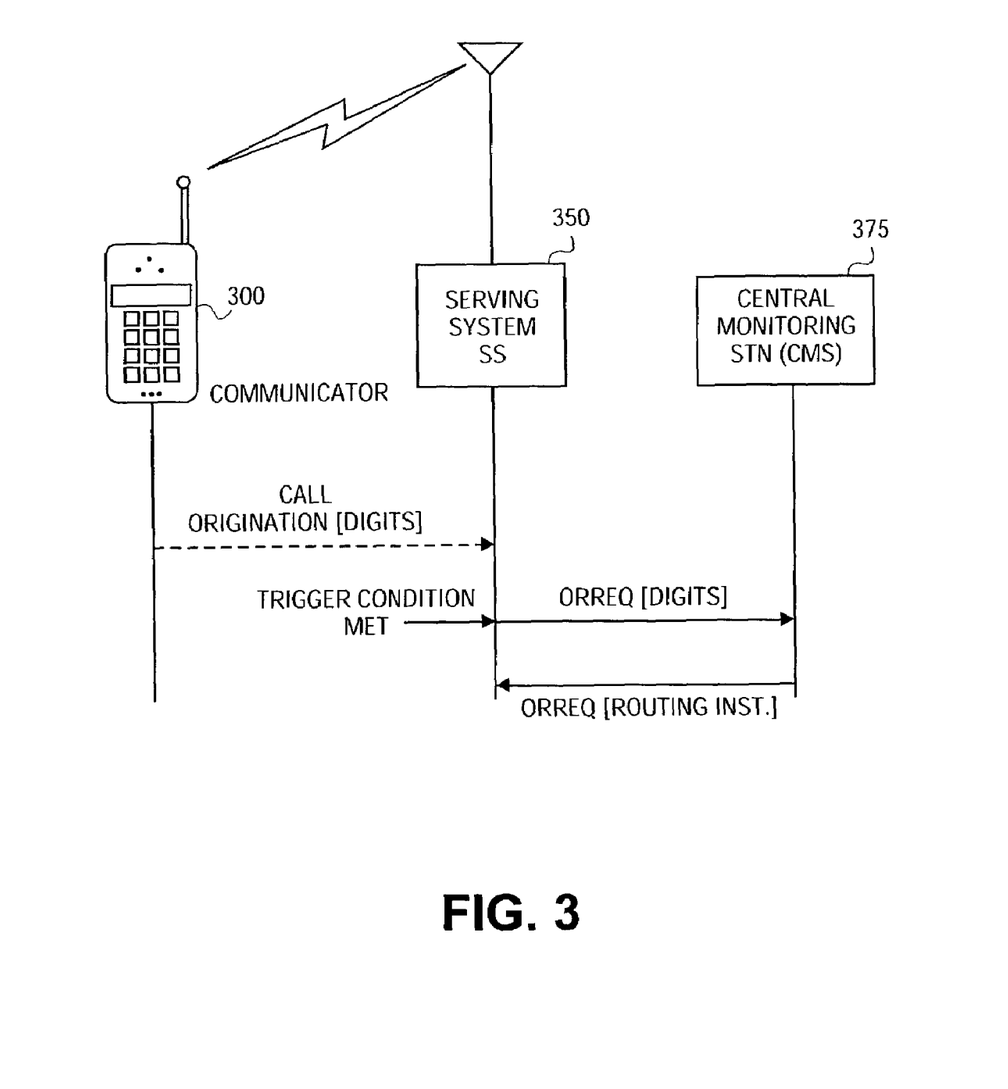
FIG. 3 illustrates an embodiment of the invention showing the transmission of the encoded application data to a central monitoring station.

Referring to FIGS. 1A and 3, at 145, the SS is armed with the call origination triggers received from the communicator's central monitoring station. A central monitoring station may transmit call origination triggers to the SS any time a need arises to change call origination triggers for a particular communicator. At 105, the SS 350 is idle. In this mode the SS is listening for a call origination message from communicator 300. At 110, the SS detects a call origination message from a communicator. At 115, the SS collects the digits encoded in the call origination message, and at 120, the SS analyzes the digits. During the digit analysis process the SS determines the category of trigger that is received. The IS-41 specification defines two basic categories of triggers: the call origination triggers and the feature request triggers. One skilled in the art will appreciate that feature request triggers always begin with an '*' and does not require explicit arming. On detecting a feature request '*' character, the SS transmits a FEATREQ control message instead of an ORREQ control message to the communicator's central monitoring station. However, if a call origination trigger for the '*' digit is armed on the SS, i.e., if bit A of octet 2 of the call origination trigger octet string, has a '1' bit, then the SS sends an ORREQ message rather than a FEATREQ message to the communicator's central monitoring station. Thus an ORREQ message has priority over a FEATREQ message.

At 125, a call origination trigger is detected at the SS, by comparing the received digits with the call origination triggers stored on the VLR. Thereafter, at 135, the SS generates and transmits an ORREQ control message to the communicator's central monitoring station 375. When generating the ORREQ control message, the SS encodes the call origination trigger, the application specific data, along with other preamble data that is received from the communicator in the ORREQ control message. In one embodiment, the application specific data is encoded in the Dialed Digits field of the ORREQ control message. One skilled in the art will recognize that the communicator's central monitoring station includes a Home Location Register (HLR) that provides control and intelligence in cellular and wireless networks. In particular, the HLR provides the primary database repository of communicator information for communicators that are served by the SS with which the HLR is associated. The HLR contains records for each communicator associated with the HLR, and includes location information, subscribed features and directory numbers.

Figure 2:
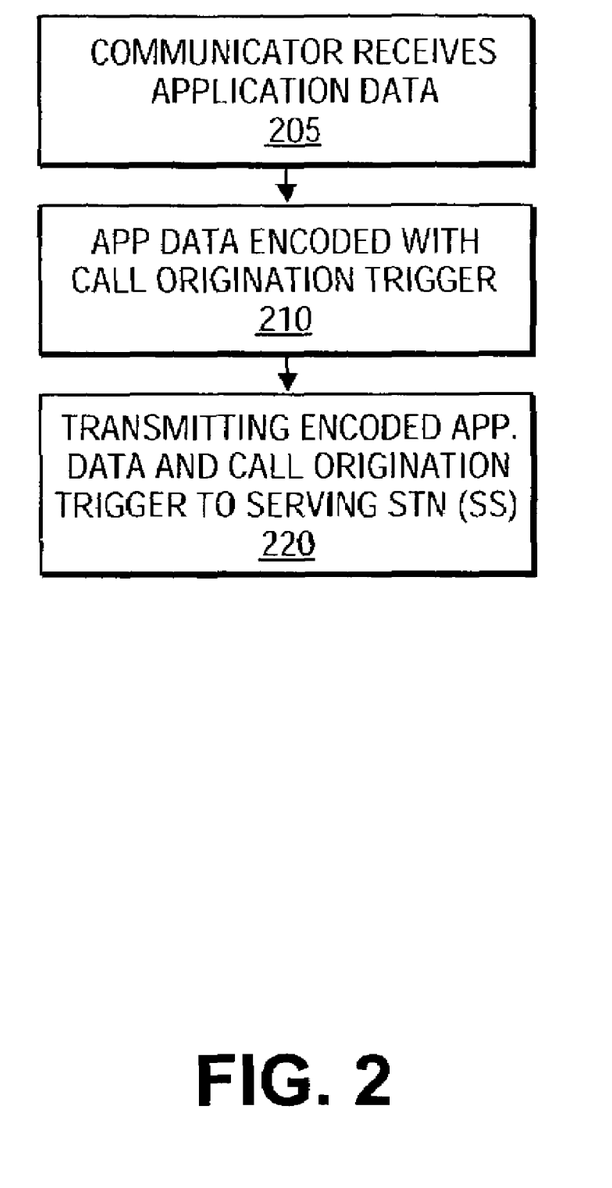
FIG. 2 illustrates an embodiment of the invention wherein a communicator encodes application data along with a call origination trigger in a control message for transmission to a serving system.

FIG. 2 illustrates an embodiment wherein the communicator receives a cellular page. In one embodiment, at 205, the communicator receives a command from the central monitoring station. One skilled in the art will appreciate that the command may be received at the communicator via any number of communications channels including but not limited to a paging network broadcast channel, a satellite communications channel, a time division multiple access (TDMA) digital broadcast channel, etc. At 210, the communicator encodes the application specific data and a call origination trigger in a call origination message to invoke forwarding of the encoded application specific data by a serving system upon detecting the call origination trigger. At 220, the communicator transmits the call origination message, to a SS over a control channel of a cellular telecommunications network, bypassing the voice channels. The SS, on detecting the call origination message, collects the digits that are transmitted by the communicator, analyzes the digits received, and determines whether a call origination trigger is present. If a call origination trigger is received, the SS transmits the call origination trigger along with the application specific data using an ORREQ control message to the central monitoring station. In one embodiment, the ORREQ control message includes application specific data that is encoded in the Dialed Digits field in the ORREQ control message transmitted to the central monitoring station. In another embodiment, the ORREQ control message may include application specific data encoded in fields other than in the Digits Dialed field of the ORREQ control message. The application specific data may be stored in the Mobile Identification Number (MIN) field or in the Electronic Serial Number (ESN) field. Included in the ORREQ control message is the call origination trigger that caused the ORREQ control message to be transmitted to the central monitoring station.

In one embodiment, when the ORREQ control message arrives at the central monitoring station, the central monitoring station extracts the application specific data embedded in the Dialed Digits field, as well as from other fields in the ORREQ control message, if necessary. The application specific data that is extracted from the ORREQ control message may be further manipulated depending on the application. Alternately, the application specific data that is extracted from the ORREQ control message may be transmitted to an application service provider for further analysis. When the ORREQ control message with the encoded application specific data is received by the central monitoring station, the central monitoring station transmits a control message to the SS to terminate communications with the communicator without requiring voice channel access by the communicator.

FIG. 3 illustrates an embodiment of the invention via a simplified block diagram. As FIG. 3 illustrates, communicator 300 sends a call origination message which includes a call origination trigger and application specific data in the Dialed Digits field of the control message to SS 350. SS 350 analyzes the digits received, and if a call origination trigger is detected, transmits the call origination trigger and the application specific data via an ORREQ control message to central monitoring station 375. Central monitoring station 375 transmits an ORREQ result message back to communicator 300 to terminate communications with the communicator without-assigning a voice channel. Thus a method has been described wherein application specific data is transmitted to a communicator's central monitoring station using only the control channels of a wireless telecommunications system, wherein the wireless voice channels have been bypassed.

Figure 4:
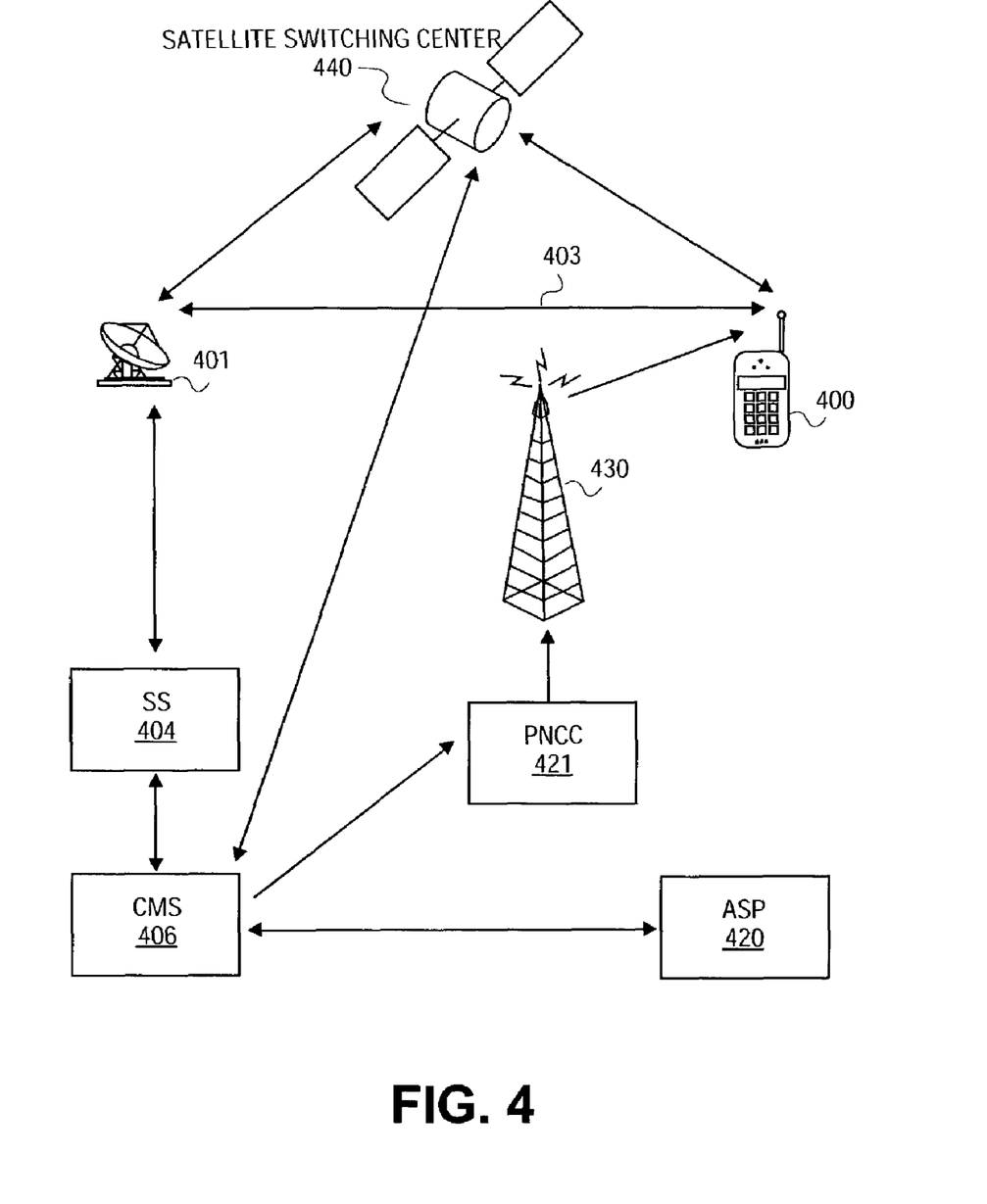
FIG. 4 illustrates an embodiment of the invention showing a communicator communicating with an application service provider.

Referring to FIG. 4, in one embodiment, a communicator 400 transmits an application specific data packet 403, which is received by base antenna 401, and is thereafter transmitted to SS 404. In one embodiment, the application specific data packet is analyzed at the SS, and the call origination trigger along with the application specific data is sent to central monitoring station 406 via an ORREQ control message. In one embodiment the communicator transmits the application specific data along with the call origination trigger in a call origination message to a satellite switching center 440. The satellite switching center analyzes the call origination message and transmits the application specific data including the call origination trigger via an ORREQ control message to a central monitoring station (CMS). In one embodiment, the satellite switching center transmits the call origination message to a SS. The SS includes the application specific data along with the call origination trigger in an ORREQ control message that is transmitted to the communicator's central monitoring station. Once the ORREQ control message is received by the central monitoring station, the central monitoring station interrogates its HLR, retrieves the application specific data from the received ORREQ control message, and if applicable, transmits the application specific data to an application specific provider (ASP) 420.

Once received at the ASP 420, the ASP analyzes the data, and if a response is warranted, the ASP transmits a message to the central monitoring station 406. Once received, the central monitoring station 406 interrogates its own HLR, retrieves the user's most recent serving cellular system location, looks up a paging company that serves that particular geographic service area, coordinates and establishes its routing tables, and sends the application specific data to the paging network control center (PNCC) 421. The PNCC transmits the application specific data to the communicator via one or more transmission towers 430.

The application specific data may contain a variety of information. For example, the application specific data may be a simple phone number that tells the user to call a person that paged him. Or if the communicator 400 is equipped with a GPS receiver, the application specific data may be an automatic command that causes the communicator to perform an automatic location update by correlating GPS Navstar satellite code timing bits, for example, and derive an accurate relative location. Once the relative location update is performed, the new location is systematically derived and compiled for message transmission.

The technique described above allows for applications such as two way paging, fleet management, motor vehicle anti-theft and recovery, home arrest, personnel management, remote stationary sensor management, utility meters etc.

In one embodiment, the communicator comprises a transceiver that is communicatively coupled to at least one processor and a memory. The transceiver receives application specific data from a remote sensing device. The application specific data is encoded along with a call origination trigger in a call origination message to invoke forwarding of the call origination message, including the application specific data by a SS upon detecting the call origination trigger. The call origination message is then transmitted to a SS by the transceiver.

Referring to FIG. 4, in one embodiment, communicator 400 encodes the application specific data from a process controller in a control message 403 along with a call origination trigger that is unique to a process condition. The encoded trigger in the communicator corresponds with a call origination trigger stored in the VLR. The call origination trigger, and the application specific data from the process controller is encoded in a sequence of digits associated with the call origination message 403 that is transmitted to the SS 404. After encoding the application specific data in the call origination message, the call origination message 403 is transmitted by the communicator to SS 401. The SS, on detecting the call origination trigger forwards the call origination message 403 over a communications channel to a central monitoring station 406 using the ORREQ control message. In one embodiment the call origination message is transmitted to the central monitoring station over at least one inter cellular serving area link using the SS7 protocol. The central monitoring station strips the encoded message from the ORREQ control message and requests the SS to terminate communications with the communicator without assigning a voice channel to the communicator.

The central monitoring station 406 may transmit the application specific data that is received from the communicator to an application service provider 420 for further processing. Application service provider 420 analyzes the data and sends a reply message to the central monitoring station 406. In one embodiment, the reply message informs the communicator to take steps to adjust the process controller so that the process is once again in a steady state condition. In another embodiment, the reply message informs the communicator to shut down the process. Thus, reply messages from the ASP can be used to control the operation of the process controller. The central monitoring station 406, as described above, interrogates its own HLR, retrieves the communicator's most recent serving cellular system location, looks up a paging company that serves that particular geographic service area, coordinates and establishes its routing tables, and sends the message to the paging network control center (PNCC) 421. The PNCC transmits the message to the communicator via one or more transmission towers 430.

Thus a method and apparatus has been disclosed for communicating using wireless control channels. Embodiments of the invention may be represented as a software product stored on a machine-readable medium (also referred to as a computer-readable medium or a processor-readable medium). The machine-readable medium may be any type of magnetic, optical, or electrical storage medium including a diskette, CD-ROM, memory device (volatile or non-volatile), or similar storage mechanism. The machine-readable medium may contain various sets of instructions, code sequences, configuration information, or other data. For example, the procedures described herein for polling network elements by network management stations can be stored on the machine-readable medium. Those of ordinary skill in the art will appreciate that other instructions and operations necessary to implement the described invention may also be stored on the machine-readable medium.

What is claimed is:

1. A method comprising:
receiving a message at a communicator from a remote sensing device, the message comprising application data that is unrelated to call control;
encoding in a control message
the received message comprising application data,
an identifier of the communicator, and
a trigger to invoke forwarding of the encoded message and the encoded trigger by a serving system of a telecommunications network, the trigger associated with a remote feature control request;
transmitting the encoded control message to the serving system of the telecommunications network over a control channel, bypassing voice channels;
detecting at the serving system of the telecommunications network the trigger in the encoded control message;
identifying, based on the detected trigger, a second trigger active at the serving system of the telecommunications network; and
in response to identifying the active second trigger, transmitting an origination request message over a communications channel to a central monitoring station, the origination request message including the trigger and the message comprising application specific data.

2. The method of claim 1, wherein the second trigger is activated at the serving system in response to a central monitoring station.

3. The method of claim 1, further comprising the central monitoring station decoding the encoded message to retrieve the application data.

4. The method of claim 1, wherein transmitting the encoded control message to the serving system of a telecommunications network comprises transmitting the encoded control message to a serving mobile switching center (hereafter MSC) in a cellular radio telecommunications network.

5. The method of claim 1, wherein detecting the trigger in the encoded control message includes detecting the call origination trigger at the serving MSC, and wherein transmitting the origination request message includes transmitting over at least one inter cellular serving area link between the serving MSC and the central monitoring station.

6. The method of claim 5, wherein the inter cellular serving area link between the serving MSC and the central monitoring station operates according to the signaling system 7 (SS7) protocol standard.

7. The method of claim 1, wherein identifying the second trigger active at the serving system comprises the serving system comparing the detected trigger with origination triggers stored in a Visitor Location Register (hereafter VLR), the VLR receiving the triggers from a Home Location Register (hereafter HLR).

8. The method of claim 1, wherein the remote sensing device comprises an alarm system, and receiving the message at the communicator comprises receiving data specifying a status of an alarm system at the communicator.

9. The method of claim 1, wherein the sensing device comprises a tracking system, and receiving the message at the communicator comprises receiving tracking data from the tracking system at the communicator.

10. The method of claim 1, wherein the remote sensing device comprises a utility meter, and receiving the message at the communicator comprises receiving a reading from the utility meter at the communicator.

11. The method of claim 1, wherein the remote sensing device comprises a two-way paging device, and receiving the message at the communicator comprises receiving a response to a page from a two-way paging device.

12. The method of claim 1, wherein the remote sensing device comprises a process controller, and receiving the message at the communicator comprises receiving process data from the process controller.

13. A method comprising:
inserting a message comprising application data that is unrelated to call control in a control message to be transmitted by a cellular mobile radio (hereafter CMR) communications device;
encoding in the control message
a mobile identification number (hereafter MIN) identifying the CMR communications device, and
a trigger to invoke forwarding of the encoded message by a serving mobile switching center (hereafter MSC), the trigger associated with a remote feature control request; and
transmitting the encoded control message to the serving MSC over a control channel of a cellular telecommunications network, bypassing voice channels;
analyzing the transmitted control message at the serving MSC and detecting the trigger;
determining based on the detected trigger that a second trigger is active at the serving MSC;
in response to determining that the second trigger is active, forwarding the trigger and the message comprising application data to a central monitoring station over an inter cellular serving area network channel determined by the MIN using an OriginationRequest Invoke (hereafter ORREQ) message;
receiving the ORREQ message including the application data message at the central monitoring station; and
extracting the application data message from the ORREQ message.

14. The method of claim 13 wherein extracting the application data message from the ORREQ message comprises forwarding the application data message to an application service provider.

15. The method of claim 13 further comprising:
transmitting the message from a remote sensing device to the CMR communications device, and
receiving the message at the CMR communications device prior to inserting the message in the call origination control message to be transmitted by the CMR.

16. The method of claim 13, wherein the remote sensing device comprises an alarm system, and receiving the message at the CMR communications device comprises receiving data specifying a status of an alarm system at the CMR communications device.

17. The method of claim 13, wherein the remote sensing device comprises an tracking system, and receiving the message at the CMR communications device comprises receiving tracking data from the tracking system at the CMR communications device.

18. The method of claim 13, wherein the remote sensing device comprises a utility meter, and receiving the message at the CMR communications device comprises receiving readings from the utility meter at the CMR communications device.

19. The method of claim 13, wherein the remote sensing device comprises a two-way paging device, and receiving the message at the CMR communications device comprises receiving a response to a page at the CMR communications device.

20. The method of claim 13, wherein the remote sensing device comprises a process controller, and receiving the message at the CMR communications device comprises receiving process data at the CMR communications device.

21. The method of claim 13, wherein the message comprises a response to a command from the central monitoring station.

22. The method of claim 13, wherein the message comprises any one message from a group consisting of a digitized audio message, and a digitized video message.

23. A method comprising:
receiving a message at a communicator from a remote sensing device, the message comprising application data that is unrelated to call control;
encoding the received message along with an identifier of the communicator and a trigger in a control message, the encoding the trigger to invoke forwarding of the encoded message by a satellite switching center upon detecting the call origination trigger;
transmitting the encoded control message to the satellite switching center over a control channel, bypassing voice channels;
detecting the trigger at the satellite switching center;
identifying, based on the detected trigger, a second trigger active at the satellite switching center; and
in response to identifying the active second trigger, forwarding the trigger and the encoded message over a communications channel to a central monitoring station using a call origination request message; and
decoding the encoded message to retrieve the application data.

24. A method comprising:
receiving via a control channel an encoded control message from a communicator, the encoded control message including
application data that is unrelated to call control,
an identifier of the communicator, and
a trigger associated with a remote feature control request;
detecting the trigger in the encoded control message;
identifying, based on the detected trigger, that a second trigger is active; and
in response to identifying the active second trigger, transmitting an origination request message over a communications channel to a central monitoring station, the origination request message including the trigger and the message comprising application specific data.

25. The method of claim 24, further comprising:
receiving a message from the central monitoring station; and
activating the second trigger in response to the message received from the central monitoring station.

26. An apparatus comprising:
a machine-accessible medium having stored thereon instructions, that when executed by a machine, cause said machine to perform operations including
receiving a message from the central monitoring station;
activating a second trigger in response to the message received from the central monitoring station;
receiving from a cellular mobile radio (CMR) communications device an encoded control message including
application data that is unrelated to call control,
an identifier of the CMR, and
a first trigger associated with a remote feature control request;
detecting the first trigger in the encoded control message;

identifying, based on the detected first trigger, that the second trigger is active; and in response to identifying that the second trigger is active, transmitting an origination request message over a communications channel to the central monitoring station, the origination request message including the first trigger and the message comprising application specific data.

27. An apparatus comprising:

means for receiving from a communicator an encoded control message including
 application data that is unrelated to call control,
 an identifier of the communicator, and
 a trigger associated with a remote feature control request;

means for detecting the trigger in the encoded control message;

means for identifying, based on the detected trigger, that a second trigger is active; and means, responsive to the identifying the active second trigger, for transmitting an origination request message over a communications channel to a central monitoring station, the origination request message including the trigger and the message comprising application specific data.

* * * * *